US009735555B2

(12) United States Patent
Fishovitz et al.

(10) Patent No.: US 9,735,555 B2
(45) Date of Patent: Aug. 15, 2017

(54) MECHANICAL DOOR INTERLOCK DEVICE FOR PROTECTING POWER ELECTRICAL SWITCHING APPARATUS AND USERS

(71) Applicant: Eaton Corporation, Cleveland, OH (US)

(72) Inventors: Anthony John Fishovitz, Freedom, PA (US); James Jeffery Benke, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 64 days.

(21) Appl. No.: 14/836,995

(22) Filed: Aug. 27, 2015

(65) Prior Publication Data

US 2017/0063050 A1    Mar. 2, 2017

(51) Int. Cl.
| | |
|---|---|
| *H02B 1/06* | (2006.01) |
| *H02B 11/133* | (2006.01) |
| *E05F 15/60* | (2015.01) |
| *E05F 15/70* | (2015.01) |

(52) U.S. Cl.
CPC ............ *H02B 11/133* (2013.01); *E05F 15/60* (2015.01); *E05F 15/70* (2015.01); *H02B 1/066* (2013.01)

(58) Field of Classification Search
CPC ........ H02B 1/066; H02B 1/44; H05K 5/0208; H01H 9/22; E05F 15/60; E05F 15/70
See application file for complete search history.

(56) References Cited

U.S. PATENT DOCUMENTS

| | | |
|---|---|---|
| 4,190,755 A | 2/1980 | Rogers |
| 5,077,631 A | 12/1991 | Cleary |
| (Continued) | | |

FOREIGN PATENT DOCUMENTS

| | | |
|---|---|---|
| CN | 201690136 | 12/2010 |
| CN | 203377505 | 1/2014 |
| (Continued) | | |

OTHER PUBLICATIONS

European Patent Office, "International Search Report and Written Opinion" PCT/US16/048506, Nov. 4, 2016, 11 pp.

*Primary Examiner* — Robert J Hoffberg
(74) *Attorney, Agent, or Firm* — Eckert Seamans; David Jenkins; Grant Coffield

(57) ABSTRACT

A mechanical switch-door interlock assembly includes a mounting assembly and an actuator assembly. The actuator assembly includes a body, a door sensor, an operating mechanism handle actuator, and a number of sliding coupling components. The actuator assembly body is slidably coupled to the mounting assembly. The actuator assembly body moves between a first position, wherein the operating mechanism handle actuator does not operatively engage the operating mechanism handle, and a second position, wherein the operating mechanism handle actuator operatively engages the operating mechanism handle and moves the operating mechanism handle to the second position. When a door is in a first position, the door operatively engages the door sensor and moves the actuator assembly body to the first position. When the door is in the second position, the door does not operatively engage the door sensor allowing the actuator assembly body to move into the second position.

18 Claims, 3 Drawing Sheets

(56) References Cited

U.S. PATENT DOCUMENTS

| | | | |
|---|---|---|---|
| 5,963,420 A * | 10/1999 | Bailey | H01H 9/223 200/50.02 |
| 6,023,030 A | 2/2000 | Latimer et al. | |
| 6,338,536 B1 * | 1/2002 | Ueno | E05B 17/0033 312/405 |
| 6,545,859 B2 * | 4/2003 | Leccia | H02B 11/133 200/50.12 |
| 6,943,999 B2 * | 9/2005 | Gray | H02B 11/133 361/1 |
| 6,974,922 B2 * | 12/2005 | Bortolloni | H01H 9/223 200/50.05 |
| 6,989,499 B2 * | 1/2006 | Bortolloni | H01H 9/28 200/329 |
| 7,019,229 B1 * | 3/2006 | Weister | H01H 9/22 200/50.01 |
| 7,315,006 B2 * | 1/2008 | Houck, III | H01H 3/50 200/331 |
| 9,425,588 B2 * | 8/2016 | Fischer | H01H 9/22 |
| 2002/0100667 A1 | 8/2002 | Leccia | |
| 2003/0019984 A1 * | 1/2003 | Yee | H02B 1/38 248/220.31 |
| 2006/0049026 A1 | 3/2006 | Weister et al. | |
| 2009/0107819 A1 * | 4/2009 | Samudrikam | H01H 3/10 200/336 |
| 2013/0256102 A1 | 10/2013 | Hager et al. | |

FOREIGN PATENT DOCUMENTS

| | | | |
|---|---|---|---|
| JP | 2002135919 | 5/2002 | |
| JP | 2010252561 | 11/2010 | |
| KR | 1020100010918 | 3/2012 | |
| WO | WO 2011161005 A2 * | 12/2011 | E05B 63/24 |
| WO | WO 2013076048 A1 * | 5/2013 | H02B 11/133 |

* cited by examiner

MECHANICAL DOOR INTERLOCK DEVICE FOR PROTECTING POWER ELECTRICAL SWITCHING APPARATUS AND USERS

BACKGROUND OF THE INVENTION

Field of the Invention

The disclosed concept relates generally to electrical switching apparatus and, more particularly, to an interlock fir an enclosed electrical switching apparatus.

Background Information

Electrical switching apparatus used in power distribution systems are often mounted within a switchgear enclosure either individually or in combination with other switchgear (e.g., without limitation, circuit switching devices and circuit interrupters such as, but not limited to, electrical switching apparatus, contactors, motor starters, motor controllers and other load controllers). That is, the enclosure includes a number of sidewalk and a movable door defining an enclosed space.

Some electrical switching apparatus such as, for example, some medium-voltage and low-voltage electrical switching apparatus, can be relatively large. In order to facilitate movement (e.g., installation; removal; maintenance), such electrical switching apparatus are commonly coupled to draw-out mechanisms which permit such electrical switching apparatus to be drawn out of the switchgear enclosure. Accordingly, such electrical switching apparatus are commonly known in the art as "draw-out" electrical switching apparatus. The electrical switching apparatus may be further supported within a draw-out frame, commonly known in the art as a cassette or chassis. The draw-out mechanism includes, for example, a combination of rails and rollers coupled to one or the other, or both, of the sidewalls of the cell and the sides of the corresponding electrical switching apparatus and/or cassette, which is to be drawn into and out of the cell.

To reduce the chance of injury or damage to the electrical switching apparatus, the enclosure typically includes a "door-switch" interlock. Generally, an interlock is used to prevent a certain action when a device is in a selected position or configuration. As used herein, an "[X]-[Y] interlock" means that element [X] is locked when element [Y] is in a potentially hazardous configuration. Thus, a "door-switch" interlock is structured to, and operates on a principle of, locking the enclosure door when the electrical switching apparatus is energized. That is, when the electrical switching apparatus is energized, the enclosure door is locked in a closed position thereby preventing a user from removing the energized electrical switching apparatus.

Such door-switch interlocks have several disadvantages. For example, a door-switch interlock does not prevent the electrical switching apparatus from being energized once the door is opened. That is, a user may de-energize the electrical switching apparatus, open the door, then re-energize the electrical switching apparatus leaving the user exposed to an energized assembly. Further, interlocks often utilize rotating elements that are subject to wear. That is, a rotating element is disposed in a bearing or bore that wears, thereby allowing the rotating element to become misaligned. Interlocks, especially interlocks with multiple functions, are complex assemblies that are expensive and time consuming to install and are subject to degradation. That is, a combined switch-door interlock assembly/door-switch interlock assembly includes components that both lock the switch when the door is in a specific configuration and lock the door when the switch is in a specific configuration. Such a combined switch-door interlock assembly/door-switch interlock assembly may have one interlock wear down and need to have both interlocks replaced due to their combined nature. Further, interlocks also are often built into a cassette; that is, such interlocks are not able to be added to a cassette at a later time. Interlocks may also include electrical components, such as, but not limited to position sensors, that are not operable when de-energized.

There is, therefore, a need for an interlock structured to overcome these disadvantages as well as other. There is a further need for an interlock structured to operate with enclosures, cassettes and other hardware presently in use.

SUMMARY OF THE INVENTION

These needs, and others, are met by at least one embodiment of the disclosed and claimed concept which provides a mechanical switch-door interlock assembly. The mechanical switch-door interlock assembly includes a mounting assembly and an actuator assembly. The mounting assembly includes a number of sliding coupling components. The actuator assembly includes a body, a door sensor, an operating mechanism handle actuator, and a number of sliding coupling components. The door sensor is coupled to the actuator assembly body. The operating mechanism handle actuator is coupled to the actuator assembly body. The actuator assembly body is slidably coupled to the mounting assembly. The mounting assembly is structured to be coupled to the cassette at a location wherein the operating mechanism handle actuator is disposed in the operating mechanism handle path and the door sensor is disposed in the door path. The actuator assembly body moves between an operating, first position, wherein the operating mechanism handle actuator does not operatively engage the operating mechanism handle, and a non-operating, second position, wherein the operating mechanism handle actuator operatively engages the operating mechanism handle and moves the operating mechanism handle to the second position. When the door is in the first position, the door operatively engages the door sensor and moves the actuator assembly body to the actuator assembly body first position. When the door is in the second position, the door does not operatively engage the door sensor allowing the actuator assembly body to move into the second position.

A mechanical switch-door interlock assembly in the configuration(s) discussed below solves the stated problems.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
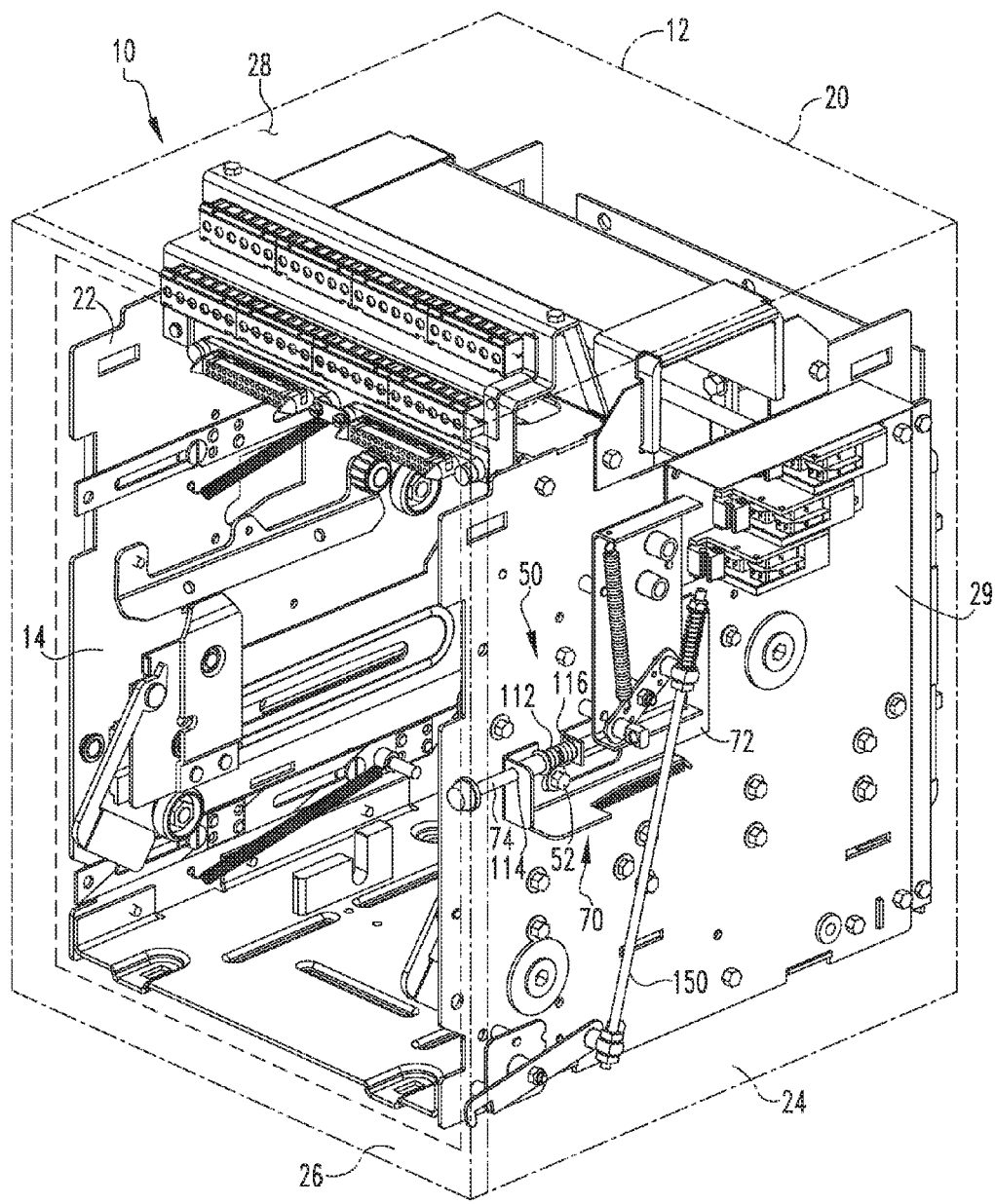
FIG. 1 is an isometric view of an electrical apparatus.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the word "unitary" means a component is created as a single piece or unit. That is, a component that includes pieces that are created separately and then coupled together as a unit is not a "unitary" component or body. Further, as used herein, the portions or elements of a "unitary" body are "coupled" together.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut. It is further understood that an opening or passage through which another coupling component extends is also a coupling component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, a first object resting on a second object, which is held in place only by gravity, is not "coupled" to the second object unless the first object is otherwise linked to the second object. That is, for example, a book on a table is not coupled thereto, but a book glued to a table is coupled thereto.

As used herein, "temporarily coupled" means that two components are coupled in a manner that allows for the components to be easily decoupled without damaging the components. For example, elements that are coupled by a nut/bolt coupling are "temporarily coupled," while elements that are welded together are not.

As used herein, the statement that two or more parts or components "engage" one another shall mean that the elements exert a force or bias against one another either directly or through one or more intermediate elements or components.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw; however, when a rotational force is applied to the screwdriver, the screwdriver "operatively engages" the screw and causes the screw to rotate. As used herein, "operatively engage" means "engage and maintain in a selected position." That is, a compressed spring held in place by a latch is "operatively engaged" by the latch in that the latch maintains the spring in a compressed state.

As used herein, the term "number" shall mean one or an integer greater than one (i.e., a plurality).

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit. Further, as used herein, "loosely correspond" means that a slot or opening is sized to be larger than an element disposed therein. This means that the increased size of the slot or opening is intentional and is more than a manufacturing tolerance. Further, with regard to a surface formed by two or more elements, a "corresponding" shape means that surface features, e.g. curvature, are similar.

As used herein, "structured to [verb] or be an [X]" means that the identified element or assembly has a structure that is shaped, sized, disposed, coupled and/or configured to perform the identified verb or to be what is identified in the infinitive phrase. For example, a member that is "structured to move" is movably coupled to another element and includes elements that cause the member to move or the member is otherwise configured to move in response to other elements or assemblies. As such, as used herein, "structured to [verb] or 'be an [X]'" recites structure and not function. Further, as used herein, "structured to [verb] 'be an [X]'" means that the identified element or assembly is intended to, and is designed to, perform the identified verb or to be an [X]. Thus, an element that is only possibly "capable" of performing the identified verb but which is not intended to, and is not designed to, perform the identified verb is not "structured to [verb or 'be an [X]'."

As used herein, a "path" or "path of travel" is the space an element moves through when in motion.

As used herein, "mechanical" means without electronic elements, components, or sub-components. That is, a "mechanical" [X] does not include any electronic elements, components, or sub-components.

Figure 2:
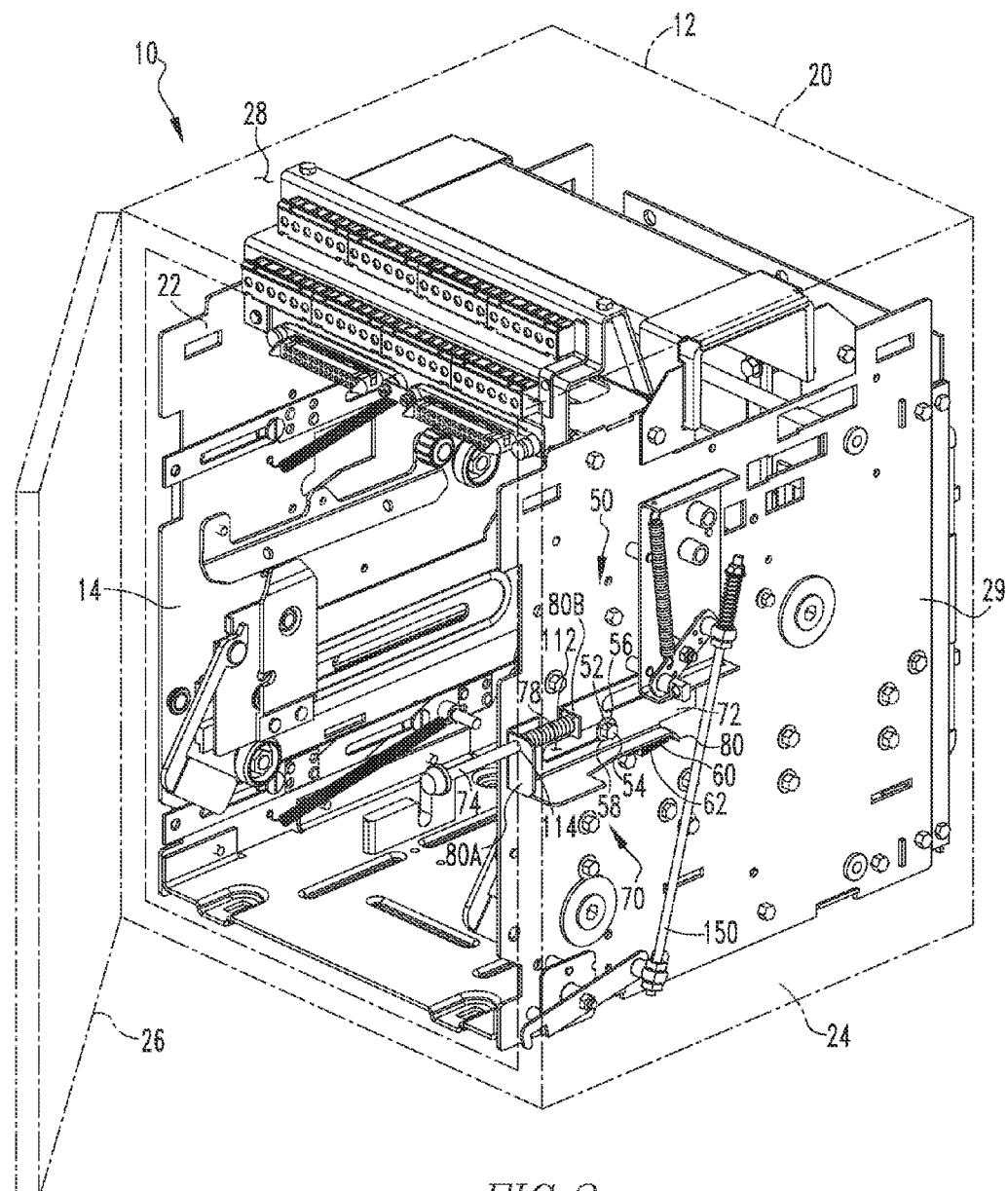
FIG. 2 is an isometric view of an electrical apparatus.

As shown in FIGS. 1 and 2, and in an exemplary embodiment, an enclosed electrical switching apparatus assembly 10 includes an enclosure assembly 12 and an electrical switching apparatus 14 (both shown schematically in ghost). It is understood that the term "electrical switching apparatus" is interpreted broadly and means circuit breakers, switching devices, and similar devices which are structured to be in at least an energized configuration and a de-energized configuration. The enclosure assembly 12 includes a housing assembly 20 (shown schematically and in ghost) and a movable cassette 22. The enclosure assembly housing assembly 20 includes a number of sidewalls 24 and a movable door 26 (both shown schematically and in ghost). The enclosure assembly housing assembly sidewalk 24 and movable door 26 define an enclosed space 28. The door 26 is movably coupled to the enclosure assembly housing assembly sidewalls 24 and is movable over a path (hereinafter "door path") between a closed, first position (FIG. 1) and an open, second position (FIG. 2). As shown in an exemplary embodiment, the door 26 is pivotally coupled to the enclosure assembly housing assembly sidewalls 24.

The cassette 22 is structured to movably support the electrical switching apparatus 14. In an exemplary embodiment, the enclosure assembly housing assembly 20 includes a number of rails (not shown) and the cassette 22 includes a number of wheels (not shown). The electrical switching apparatus 14 is disposed on the cassette 22. The cassette 22, and therefore the electrical switching apparatus 14, is structured to move between an inserted, first position and a withdrawn, second position. That is, the cassette 22 is movably disposed relative to the enclosure assembly enclosed space 28 and is structured to move between an inserted, first position, wherein the cassette 22 is substantially disposed in the enclosed space 28, and a withdrawn, second position, wherein the cassette 22 is substantially, or partially, disposed outside the enclosed space 28. In an exemplary embodiment, the cassette 22 includes two lateral sidewalk 29 that are disposed on either side of the electrical switching apparatus 14.

Figure 3:
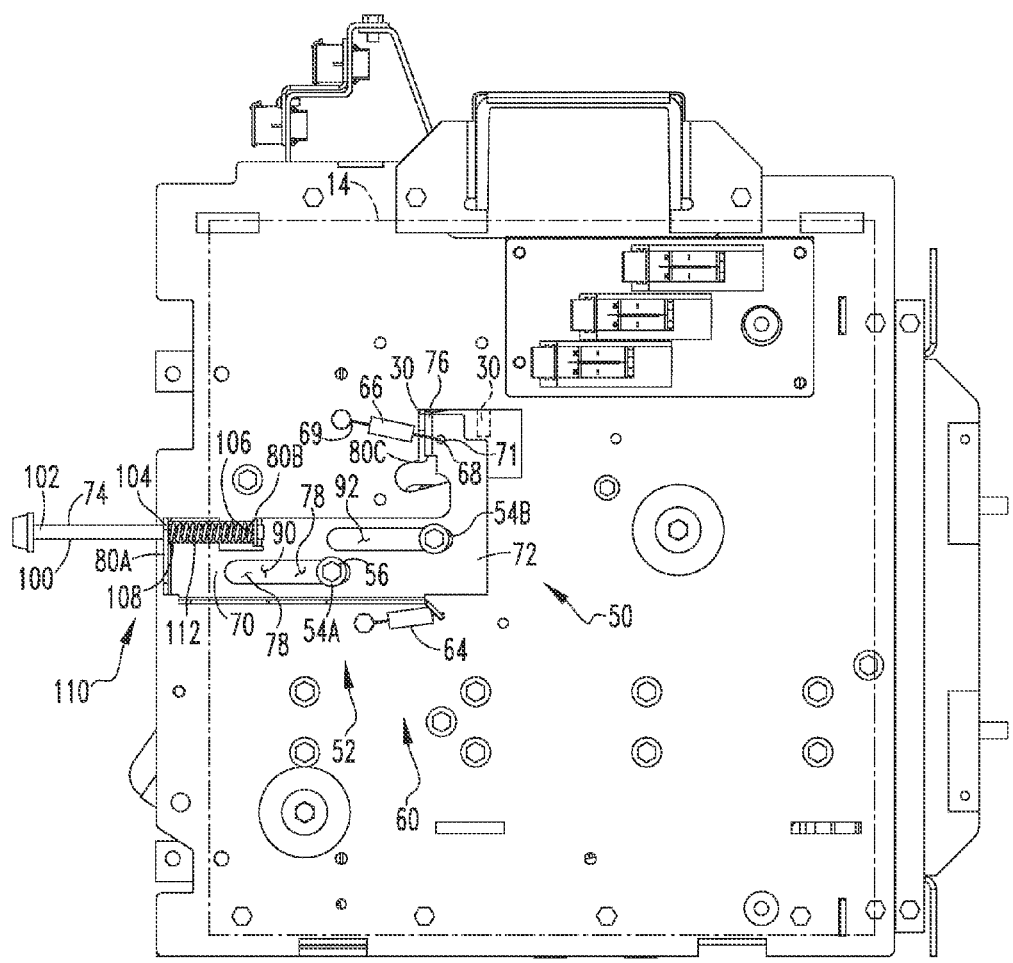
FIG. 3 is a side view of an electrical apparatus.

In an exemplary embodiment, the electrical switching apparatus 14 includes an operating mechanism (not shown) with an associated handle 30 (shown schematically in a second position, and in ghost in a first position in FIG. 3). As used herein, the "operating mechanism handle" is an actuator and include handles, buttons, knobs and similar constructs. The operating mechanism handle 30 is coupled to an electrical switching apparatus operating mechanism (not shown) and is structured to change the configuration of the electrical switching apparatus 14. That is, in an exemplary embodiment, the electrical switching apparatus 14 is a circuit breaker (not shown) which includes separable contacts (not shown). The electrical switching apparatus operating mechanism is structured to move the separable contacts between an open, de-energized configuration, and a closed, energized configuration. The operating mechanism handle 30 moves over a path (hereinafter "operating mechanism handle path") between a closed, first position, wherein the electrical switching apparatus 14 is energized, and an open, second position, wherein the electrical switching apparatus 14 is de-energized. That is, when operating mechanism handle 30 is in the closed, first position, the operating mechanism positions, or is capable of positioning, the contacts in the closed, energized configuration. When the operating mechanism handle 30 is in the open, second position, the operating mechanism positions the separable contacts in the open, de-energized configuration. It is understood that the operating mechanism handle 30 may cause the operating mechanism to position the separable contacts in the open, de-energized configuration while traveling toward the operating mechanism handle 30 second position. It is further understood that so long as the operating mechanism handle 30 is in the second position, the contacts are in the open, de-energized configuration. Accordingly, during the normal operation of the electrical switching apparatus 114, the operating mechanism handle 30 is in the first position.

The enclosure assembly 12 further includes a mechanical switch-door interlock assembly 50. The mechanical switch-door interlock assembly 50 is structured to maintain the electrical switching apparatus 14, i.e. the switch, in a de-energized configuration when the door 26 is in the open position. As a "mechanical" assembly the mechanical switch-door interlock assembly 50 is structured to, and does, operate without electricity thereby solving the problems associated with electrical interlocks. Further, as detailed below, the mechanical switch-door interlock assembly 50 is temporarily coupled to the cassette 22. In this configuration, the mechanical switch-door interlock assembly 50 solves the problems associated with a built-in interlock.

In an exemplary embodiment, and shown in FIG. 3, the mechanical switch-door interlock assembly 50 includes a mounting assembly 52 and an actuator assembly 70. In an exemplary embodiment, the mounting assembly 52 includes a number of sliding coupling components 54 and a bias assembly 60. As partially shown, each exemplary sliding first coupling component 54 includes a bolt 56, a nut (not shown), and an opening (not shown) in an enclosure assembly housing assembly sidewall 24. The sliding coupling components 54 may include a number of spacers 58. The bolt 56 is structured to maintain the head of the bolt 56 a selected distance from the nut. The selected distance corresponds to the thickness of the enclosure assembly housing assembly sidewall 24, the actuator assembly body 72, and any spacers 58. In an exemplary embodiment, there are two or more sliding coupling components 54. That is, the mounting assembly 52 includes at least a first sliding coupling first component 54A and a second sliding coupling first component 54B.

The bias assembly 60 is structured to bias the actuator assembly body 72, described below, to a second position. In an exemplary embodiment, the bias assembly 60 includes a number of tension springs 62. As shown, there is a first bias assembly spring 64 and a second bias assembly spring 66. The bias assembly 60 also includes a first spring coupling 68 and a second spring coupling 69 for each bias assembly spring 64, 66. In an exemplary embodiment, each spring coupling 68, 69 is a hook coupling. As used herein, a "hook coupling" is a coupling component structured to be coupled to a hook. That is, for example, each bias assembly spring 64, 66 may include a hook at each end thereof. Thus, a "hook coupling," as used herein, includes an opening through which a hook may be passed, as well as, a rod, such as but not limited to, a bolt shaft, over which a hook may be disposed.

The actuator assembly 70 includes a body 72, a door sensor 74, an operating mechanism handle actuator 76, and a number of sliding second coupling components 78. In an exemplary embodiment, the actuator assembly body 72 defines the door sensor 74, the operating mechanism handle actuator 76, and the number of sliding coupling second components 78. That is, the actuator assembly body 72, the door sensor 74, the operating mechanism handle actuator 76, and the number of sliding coupling components 78 are unitary. In an exemplary embodiment, there is a first sliding coupling second component 78A and a second sliding coupling second component 78B, which correspond to the first sliding coupling first component 54A and second sliding coupling first component 54B, respectively. Further, as noted above, the actuator assembly 70 is part of the "mechanical" switch-door interlock assembly 50 meaning that none of the elements thereof are electronic. Further, in an exemplary embodiment, the actuator assembly body 72 defines a number of openings 71 that act as the first spring coupling 68.

In an exemplary embodiment, the actuator assembly body 72 is generally planar and includes a number of tabs 80. That is, as used herein, a "planar body" may include selected portions thereof that are disposed out of the plane of the planar body. The selected portions, however, do not have a greater area than the planar portion of the body. In an exemplary embodiment, tabs 80 define a door sensor support assembly 110 (discussed below), the operating mechanism handle actuator 76, and a bias assembly first spring coupling 68. The actuator assembly body 72 further includes at least two elongated slots 90, 92 which are the actuator assembly sliding second coupling components 78A, 78B. In an exemplary embodiment, the slots 90, 92 are offset, i.e. parallel and not disposed along the same line, from each other.

The door sensor 74 is a mechanical element and, in an exemplary embodiment, is an elongated body 100 extending from the actuator assembly body 72. In one embodiment, not shown, the door sensor body 100 is fixed to the actuator assembly body 72. In another exemplary embodiment, not shown, the door sensor 74 is an elongated portion of the actuator assembly body 72. That is, the door sensor 74 is unitary with the actuator assembly body 72. In the embodiment shown, however, the door sensor 74, i.e. door sensor body 100, is movably coupled to actuator assembly body 72. In this embodiment, the actuator assembly body 72 includes a door sensor support assembly 110.

The door sensor support assembly 110 includes a first tab 80A, a second tab 80B, and a spring 112. The door sensor support assembly first tab 80A includes a first passage 114. The door sensor support assembly second tab 80B includes a second passage 116. The first and second passages 114, 116 are aligned along a common axis. The door sensor body 100 includes a first end 102, a medial portion 104 and a second end 106. The door sensor body medial portion 104 includes a spring mount 108 which, in an exemplary embodiment, has a larger cross-sectional area than the first passage 114. The door sensor body 100 is sized to correspond to the first passage 114 and the second passage 116. The door sensor body 100 is slidably disposed in the first passage 114 and the second passage 116. In this configuration, the door sensor body 100 is movable between a retracted, first position, wherein the door sensor body 100 extends a first distance from the door sensor support assembly first tab 80A, and an extended, second position, wherein the door sensor body 100 extends a second distance from the door sensor support assembly first tab 80A. The door sensor support assembly spring 112 is disposed between the door sensor body spring mount 108 and the door sensor support assembly second tab 80B. In this configuration, the door sensor support assembly spring 112 biases the door sensor body 100 to the second position.

The operating mechanism handle actuator 76 is, in an exemplary embodiment, a tab 80C. The operating mechanism handle actuator 76 is structured to operatively engage the operating mechanism handle 30, as described below. In an exemplary embodiment, the operating mechanism handle actuator 76 is unitary with the actuator assembly body 72.

The mechanical switch-door interlock assembly 50 is assembled as described below. Initially, it is noted that the cassette 22 includes a number of openings disposed in appropriate locations so as to allow the mechanical switch-door interlock assembly 50 to interact with the electrical switching apparatus 14 and enclosure assembly 12 as discussed below. These openings may be preexisting or may be made in the cassette 22 including in the cassette sidewalls 29.

The mounting assembly 52 is coupled to the cassette 22 by passing the sliding first coupling components 54, i.e. bolt 56 through openings (not shown) in a cassette sidewall 29 adjacent the operating mechanism handle 30. The sliding first coupling components 54 are spaced from each other and are positioned to correspond to the sliding second coupling components 78A, 78B, i.e. slots 90, 92. The actuator assembly body 72 is then slidably coupled to the mounting assembly 52 by positioning the bolts 56 in slots 90, 92. Further, the operating mechanism handle actuator 76 is positioned adjacent the operating mechanism handle 30 and, in the operating mechanism handle path. Further, the door sensor 74 is disposed in the door path. It is noted that, because the slots 90, 92 are disposed in a parallel configuration, the actuator assembly body 72 translates (to move without rotation or angular displacement) when moved, as described below. Further, because the mounting assembly 52 and the actuator assembly body 72 are coupled to the cassette 22 by the removable sliding first coupling components 54, the mechanical switch-door interlock assembly 50 is temporarily coupled to the cassette 22.

In this configuration, the mechanical switch-door interlock assembly 50 is structured to operate as follows. The actuator assembly body 72 moves between an operating, first position, wherein said operating mechanism handle actuator 76 does not operatively engage the operating mechanism handle 30, and a non-operating, second position, wherein the operating mechanism handle actuator 76 operatively engages the operating mechanism handle 30 and moves said operating mechanism handle 30 to the second position. That is, when the actuator assembly body 72 is in the first position, the operating mechanism handle 30 is unaffected by the mechanical switch-door interlock assembly 50 and, as described above, is in the operating mechanism handle 30 first position. When the actuator assembly body 72 moves to, or is in, the second position, the operating mechanism handle actuator 76 operatively engages the operating mechanism handle 30 and moves said operating mechanism handle 30 to the second position. This, in turn, causes the operating mechanism to position the separable contacts in the open, de-energized configuration.

The bias assembly 60 is coupled to the actuator assembly body 72 and is structured to bias the actuator assembly body 72 to the second position. That is, the tension springs 62 are coupled to the first spring coupling 68, i.e. actuator assembly body openings 71 and to the second spring couplings 69, shown as nuts coupled to the cassette sidewall 29.

In this configuration, the mechanical switch-door interlock assembly 50 is further structured to operate as follows. When the door 26 is in the second position, the door 26 does not contact door sensor 74. In this configuration, the only assembly acting on the actuator assembly body 72 is the bias assembly 60. Thus, as described above, the bias assembly 60 biases the actuator assembly body 72 to the second position. As described above, when the actuator assembly body 72 is in the second position, the separable contacts are in the open, de-energized configuration. Thus, when the door 26 is in the open, second position, the electrical switching apparatus 14 is in the open, de-energized configuration.

When the door 26 is moved to, or is in, the closed, first position, the door 26 operatively engages the door sensor 74 and moves said actuator assembly body 72 to the actuator assembly body first position. That is, because the door sensor 74 is disposed in the door path, movement of the door 26 causes the door 26 to operatively engage the door sensor 74. Moreover, when the door 26 moves to, or is in, the first position, the operative engagement between the door 26 and the door sensor 74 overcomes the bias of the bias assembly 60.

It is noted that, in an exemplary embodiment with a door sensor support assembly 110, the door sensor support assembly 110 initially allows the door sensor body 100 to move relative to the actuator assembly body 72. That is, when the door 26 is open, the door 26 does not affect the door sensor body 100 and, as described above, the door sensor support assembly spring 112 biases the door sensor body 100 to the extended, second position. As the door 26 moves to the first position, the door 26 operatively engages the door sensor body 100 and overcomes the bias of the door sensor support assembly spring 112 and moves the door sensor body 100 to its first position. Once the door sensor body 100 is in its first position, further movement of the door 26 causes the actuator assembly body 72 to move as described above. It is further understood that the various spring forces, i.e., the force of door sensor support assembly spring 112 and bias assembly springs 64, 66, may be balanced so that the actuator assembly body 72 moves before the door sensor body 100 is fully in its first position.

Once the door 26 is in its first position, the actuator assembly body 72 is in its first position. As described above, when the actuator assembly body 72 is in its first position, the operating mechanism handle actuator 76 does not operatively engage the operating mechanism handle 30 and the contacts may be moved to the energized configuration by the operating mechanism.

When the door 26 is moved to the second position, the door 26 does not operatively engage the door sensor 74 and allows the actuator assembly body 72 to move into its second position. That is, as described above, when the door 26 is in the second position, the door 26 does not contact door sensor 74. In this configuration, the only force acting on the actuator assembly body 72 is the bias assembly 60 which biases the actuator assembly body 72 to the second position. Thus, when the door 26 opens, the electrical switching apparatus 14 is moved to, and maintained in, the open, de-energized configuration.

Further, as shown in FIGS. 1-2, the enclosure assembly 12 further includes a door switch interlock assembly 150 that is structured to maintain the door 26 in the first position when the electrical switching apparatus 14 is in the energized configuration. As shown, the mechanical switch-door interlock assembly 50 and the door-switch interlock assembly 150 are separate assemblies (although both may engage similar, or the same, elements on the electrical switching apparatus 14). As separate assemblies, the mechanical switch-door interlock assembly 50 and the door-switch interlock assembly 150 may be repaired/replaced individually. This configuration solves the problem of having to repair/replace a combined switch-door interlock assembly/door-switch interlock assembly.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A mechanical switch-door interlock assembly for an enclosed electrical switching apparatus assembly, said enclosed electrical switching apparatus assembly including an enclosure assembly and an electrical switching apparatus, said enclosure assembly including a housing assembly and a movable cassette, said enclosure assembly housing assembly including a number of sidewalls and a movable door, said enclosure assembly housing assembly sidewalls and said movable door defining an enclosed space, said door movably coupled to said enclosure assembly housing assembly sidewalls and movable over a door path between a closed, door first position and an open, door second position, said cassette movably disposed in said enclosure assembly enclosed space and structured to move between an inserted, cassette first position and a withdrawn, cassette second position, said electrical switching apparatus disposed on said cassette, said electrical switching apparatus including an operating mechanism handle, said operating mechanism handle movable over an operating mechanism handle path between a closed, operating mechanism handle first position, wherein said electrical switching apparatus is energized, and an open, operating mechanism handle second position, wherein said electrical switching apparatus is de-energized, said mechanical switch-door interlock assembly comprising:

a mounting assembly including a number of sliding coupling first components;

an actuator assembly including a body portion, a door sensor, an operating mechanism handle actuator portion, and a number of sliding coupling second components;

said door sensor coupled to said actuator assembly body portion;

said operating mechanism handle actuator portion coupled to said actuator assembly body portion;

said actuator assembly body portion slidably coupled to said mounting assembly utilizing said mounting assembly sliding coupling first components corresponding to said actuator assembly sliding coupling second components;

said mounting assembly structured to be coupled to said cassette at a location wherein said operating mechanism handle actuator portion is disposed in said operating mechanism handle path and said door sensor is disposed in said door path;

wherein said actuator assembly body portion translates between an operating, actuator assembly body first position, wherein said operating mechanism handle actuator does not operatively engage said operating mechanism handle, and a non-operating, actuator assembly body second position, wherein said operating mechanism handle actuator portion operatively engages said operating mechanism handle and moves said operating mechanism handle to said operating mechanism handle second position;

wherein, when said door is in said door first position, said door operatively engages said door sensor and moves said actuator assembly body portion to said actuator assembly body first position; and wherein, when said door is in said door second position, said door does not operatively engage said door sensor allowing said actuator assembly body portion to move into said actuator assembly body second position.

2. The mechanical switch-door interlock assembly of claim 1 wherein:
said mounting assembly includes a first one of said sliding coupling first components and a second one of said sliding coupling first components;
said actuator assembly includes a first one of said sliding coupling second components and a second one of said sliding coupling second components; and
wherein said first one of said sliding coupling second components and said second one of said sliding coupling second components are spaced, generally parallel slots in said actuator assembly body portion.

3. The mechanical switch-door interlock assembly of claim 1 wherein said mounting assembly number of sliding first coupling components and said actuator assembly body portion are temporarily coupled to said cassette.

4. The mechanical switch-door interlock assembly of claim 1 wherein said door sensor is movably coupled to said actuator assembly body portion.

5. The mechanical switch-door interlock assembly of claim 4 wherein:
said actuator assembly body portion includes a door sensor support assembly;
said door sensor support assembly includes a first tab, a second tab, and a spring;
said door sensor support assembly first tab includes a first passage;
said door sensor support assembly second tab includes a second passage;
said door sensor includes an elongated body, said door sensor body having a first end, a medial portion and a second end;
wherein said door sensor body medial portion includes a spring mount;
said door sensor body sized to correspond to said first passage and said second passage;
wherein said door sensor body spring mount has a larger cross-sectional area than said first passage;
said door sensor body slidably disposed in said first passage and said second passage, said door sensor body movable between a door sensor body first position, wherein said door sensor body extends a first distance from said door sensor support assembly first tab, and a door sensor body second position, wherein said door sensor body extends a second distance from said door sensor support assembly first tab;
said door sensor support assembly spring disposed between said door sensor body spring mount and said door sensor support assembly second tab; and
wherein said door sensor support assembly spring biases said door sensor body to said door sensor body first position.

6. The mechanical switch-door interlock assembly of claim 5 wherein said actuator assembly body portion and said operating mechanism handle actuator portion are unitary.

7. The mechanical switch-door interlock assembly of claim 1 wherein:
said mounting assembly includes a bias assembly;
said bias assembly structured to bias said actuator assembly body portion to said actuator assembly body second position; and
wherein when said door is in said door first position, the operative engagement between said door and said door sensor overcomes the bias of said bias assembly.

8. The mechanical switch-door interlock assembly of claim 7 wherein:
said bias assembly includes a tension spring, a first spring coupling and a second spring coupling;
said first spring coupling disposed on said actuator assembly body portion; and
said second spring coupling disposed on said cassette.

9. The mechanical switch-door interlock assembly of claim 1 wherein said enclosed electrical switching apparatus includes a door-switch interlock assembly and wherein said mounting assembly and said actuator assembly are separate from said door-switch interlock assembly.

10. An enclosed electrical switching apparatus assembly comprising:
an enclosure assembly;
an electrical switching apparatus;
said enclosure assembly including a housing assembly and a movable cassette;
said enclosure assembly housing assembly including a number of sidewalls and a movable door;
said enclosure assembly housing assembly sidewalls and said movable door defining an enclosed space;
said door movably coupled to said enclosure assembly housing assembly sidewalls and movable over a door path between a closed, door first position and an open, door second position;
said cassette movably disposed in said enclosure assembly enclosed space and structured to move between an inserted, cassette first position and a withdrawn, cassette second position, said electrical switching apparatus disposed on said cassette;
said electrical switching apparatus including an operating mechanism handle, said operating mechanism handle movable over an operating mechanism handle path between a closed, operating mechanism handle first position, wherein said electrical switching apparatus is energized, and an open, operating mechanism handle second position, wherein said electrical switching apparatus is de-energized;
a mechanical switch-door interlock assembly including a mounting assembly and an actuator assembly;
said mounting assembly including a number of sliding coupling first components;
said actuator assembly including a body portion, a door sensor, an operating mechanism handle actuator portion, and a number of sliding coupling second components;
said door sensor coupled to said actuator assembly body portion;
said operating mechanism handle actuator coupled to said actuator assembly body portion;
said actuator assembly body portion slidably coupled to said mounting assembly;
said mounting assembly structured to be coupled to said cassette at a location wherein said operating mechanism handle actuator portion is disposed in said operating mechanism handle path and said door sensor is disposed in said door path;
wherein said actuator assembly body portion translates between an operating, actuator assembly body first position, wherein said operating mechanism handle actuator portion does not operatively engage said operating mechanism handle, and a non-operating, actuator assembly body second position, wherein said operating mechanism handle actuator portion operatively engages said operating mechanism handle and moves said operating mechanism handle to said operating mechanism handle second position;

wherein, when said door is in said door first position, said door operatively engages said door sensor and moves said actuator assembly body portion to said actuator assembly body first position; and wherein, when said door is in said door second position, said door does not operatively engage said door sensor allowing said actuator assembly body portion to move into said actuator assembly body second position.

11. The enclosed electrical switching apparatus assembly of claim 10 wherein:

said mounting assembly includes a first one of said sliding coupling first components and a second one of said sliding coupling first components;

said actuator assembly includes a first one of said sliding coupling second components and a second one of said sliding coupling second components; and wherein said first one of said sliding coupling second components and said second one of said sliding coupling second components are spaced, generally parallel slots in said actuator assembly body portion.

12. The enclosed electrical switching apparatus assembly of claim 10 wherein said mounting assembly number of sliding coupling first components and said actuator assembly body portion are temporarily coupled to said cassette.

13. The enclosed electrical switching apparatus assembly of claim 10 wherein said door sensor is movably coupled to said actuator assembly body portion.

14. The enclosed electrical switching apparatus assembly of claim 13 wherein:

said actuator assembly body portion includes a door sensor support assembly;

said door sensor support assembly includes a first tab, a second tab, and a spring;

said door sensor support assembly first tab includes a first passage;

said door sensor support assembly second tab includes a second passage;

said door sensor includes an elongated body, said door sensor body having a first end, a medial portion and a second end;

wherein said door sensor body medial portion includes a spring mount;

said door sensor body sized to correspond to said first passage and said second passage;

wherein said door sensor body spring mount has a larger cross-sectional area than said first passage;

said door sensor body slidably disposed in said first passage and said second passage, said door sensor body movable between a door sensor body first position, wherein said door sensor body extends a first distance from said door sensor support assembly first tab, and a door sensor body second position, wherein said door sensor body extends a second distance from said door sensor support assembly first tab;

said door sensor support assembly spring disposed between said door sensor body spring mount and said door sensor support assembly second tab; and wherein said door sensor support assembly spring biases said door sensor body to said door sensor body first position.

15. The enclosed electrical switching apparatus assembly of claim 14 wherein said actuator assembly body portion and said operating mechanism handle actuator portion are unitary.

16. The enclosed electrical switching apparatus assembly of claim 10 wherein:

said mounting assembly includes a bias assembly;

said bias assembly structured to bias said actuator assembly body portion to said actuator assembly body second position; and wherein when said door is in said door first position, the operative engagement between said door and said door sensor overcomes the bias of said bias assembly.

17. The enclosed electrical switching apparatus assembly of claim 16 wherein:

said bias assembly includes a tension spring, a first spring coupling and a second spring coupling;

said first spring coupling disposed on said actuator assembly body portion; and said second spring coupling disposed on said cassette.

18. The enclosed electrical switching apparatus assembly of claim 10 wherein said enclosed electrical switching apparatus includes a door-switch interlock assembly and wherein said mounting assembly and said actuator assembly are separate from said door-switch interlock assembly.

* * * * *